(12) United States Patent
Takatani et al.

(10) Patent No.: US 9,928,868 B2
(45) Date of Patent: Mar. 27, 2018

(54) OPTICAL DISC HAVING A PLURALITY OF RECORDING LAYERS

(71) Applicant: MEMORY-TECH HOLDINGS, INC., Chikusei-shi, Ibaraki (JP)

(72) Inventors: Yoshihiro Takatani, Gotemba (JP); Mitsuro Satoh, Gotemba (JP); Masayoshi Tsuchiya, Tokyo (JP)

(73) Assignee: MEMORY-TECH HOLDINGS, INC., Chikusei (JP)

( * ) Notice: Subject to any disclaimer, the term of this patent is extended or adjusted under 35 U.S.C. 154(b) by 0 days.

(21) Appl. No.: 15/122,330

(22) PCT Filed: Mar. 2, 2015

(86) PCT No.: PCT/JP2015/056049
§ 371 (c)(1),
(2) Date: Aug. 29, 2016

(87) PCT Pub. No.: WO2015/129912
PCT Pub. Date: Sep. 3, 2015

(65) Prior Publication Data
US 2016/0372148 A1     Dec. 22, 2016

(30) Foreign Application Priority Data
Feb. 28, 2014   (JP) .................................. 2014-038669

(51) Int. Cl.
*G11B 7/24*        (2013.01)
*G11B 7/24035*    (2013.01)
(Continued)

(52) U.S. Cl.
CPC ...... *G11B 7/24035* (2013.01); *G11B 7/00736* (2013.01); *G11B 7/24038* (2013.01);
(Continued)

(58) Field of Classification Search
None
See application file for complete search history.

(56) References Cited

U.S. PATENT DOCUMENTS

2003/0137909 A1    7/2003   Ito et al.
2005/0190685 A1    9/2005   Lee et al.
(Continued)

FOREIGN PATENT DOCUMENTS

JP    H09-265632 A    10/1997
JP    2003-288759 A    10/2003
(Continued)

OTHER PUBLICATIONS

May 19, 2015 International Search Report issued in International Patent Application No. PCT/JP2015/056049.
(Continued)

*Primary Examiner* — Tan X Dinh
(74) *Attorney, Agent, or Firm* — Oliff PLC

(57) ABSTRACT

An optical disc including at least three layers of recording layers that each record information in an information track. The recording layer includes: an inner circumferential side region positioned on the inner circumferential side; a data region which is positioned to the outer circumferential side of the inner circumferential side region and records content information; and an outer circumferential side region positioned to the outer circumferential side of the data region. The content information is recorded in the data region of the three or more layers, and a point on an upper layer and a point on a lower layer one layer below the upper layer at which playback switches from content information of the upper layer being played back in an inner circumferential direction to content information of the lower layer, are set to be more to the outside than an innermost circumferential position of the data region.

6 Claims, 4 Drawing Sheets

(51) Int. Cl.
*G11B 7/24038* (2013.01)
*G11B 20/12* (2006.01)
*G11B 27/32* (2006.01)
*G11B 7/24073* (2013.01)
*G11B 7/007* (2006.01)
*G11B 7/26* (2006.01)

(52) U.S. Cl.
CPC ...... *G11B 7/24073* (2013.01); *G11B 20/1217* (2013.01); *G11B 27/329* (2013.01); *G11B 7/0079* (2013.01); *G11B 7/00745* (2013.01); *G11B 7/24* (2013.01); *G11B 7/26* (2013.01); *G11B 2007/00709* (2013.01); *G11B 2007/00754* (2013.01); *G11B 2020/1227* (2013.01); *G11B 2020/1238* (2013.01)

(56) References Cited

U.S. PATENT DOCUMENTS

| | | | |
|---|---|---|---|
| 2005/0237883 A1 | 10/2005 | Lee et al. | |
| 2005/0270953 A1* | 12/2005 | Okada | G11B 7/00456 369/275.1 |
| 2008/0002558 A1* | 1/2008 | Takazawa | G11B 7/00736 369/275.1 |
| 2009/0073844 A1 | 3/2009 | Sasa | |
| 2009/0092026 A1 | 4/2009 | Watanabe et al. | |
| 2010/0061204 A1 | 3/2010 | Nakatani | |
| 2010/0177610 A1 | 7/2010 | Matsuda | |
| 2011/0128830 A1 | 6/2011 | Namiki et al. | |
| 2011/0182156 A1 | 7/2011 | Sasaki et al. | |
| 2012/0327755 A1 | 12/2012 | Arimoto et al. | |

FOREIGN PATENT DOCUMENTS

| | | |
|---|---|---|
| JP | 2004-280953 A | 10/2004 |
| JP | 2007-535091 A | 11/2007 |
| JP | 2009-070520 A | 4/2009 |
| JP | 2009-123264 A | 6/2009 |
| JP | 2010-160863 A | 7/2010 |
| WO | 2005/104098 A1 | 11/2005 |
| WO | 2009/072181 A1 | 6/2009 |

OTHER PUBLICATIONS

Feb. 23, 2017 Search Report issued in European Patent Application No. 15755105.2.

* cited by examiner

A-A' Enlarged Cross Section

A-A' Enlarged Cross Section

A-A' Enlarged Cross Section

OPTICAL DISC HAVING A PLURALITY OF RECORDING LAYERS

TECHNICAL FIELD

The present invention relates to an optical disc having a plurality of recording layers.

BACKGROUND ART

Increasing of density of an optical disc such as a CD or DVD has been progressing. In recent years, by development of a violaceous laser, a BD (Blu-ray (registered trademark) Disc) in which recording density has been increased even more than in a DVD, has been achieved.

By providing a plurality of recording layers in such a BD, it is possible to implement further increasing of capacity of the optical disc (Patent Document 1).

PRIOR ART DOCUMENT

Patent Document

Patent Document 1: JP 2009-123264 A

SUMMARY OF THE INVENTION

Problem to be Solved by the Invention

In the case of multi-layering an optical disc, as storage capacity becomes increasingly large, it becomes possible to record a large amount of data on a single optical disc. Now, read of the data is performed by irradiating with a laser at a certain position on the optical disc from a pickup, and sometimes, due to a layout of data, accessibility is impaired and information cannot be smoothly read and played back. The present invention was made in view of such a problem, and has an object of providing an optical disc capable of smoothly reading and playing back information.

Means for Solving the Problem

An optical disc according to an embodiment of the present invention comprises at least three layers of recording layers that each record information in an information track formed in a spiral from one to the other of an inner circumferential side and an outer circumferential side. The recording layer comprises: an inner circumferential side region positioned on the inner circumferential side; a data region which is positioned to the outer circumferential side of the inner circumferential side region and records content information; and an outer circumferential side region positioned to the outer circumferential side of the data region. The content information is recorded in the data region of the three or more layers of recording layers, and a point on an upper layer and a point on a lower layer one layer below the upper layer at which playback switches from content information of the upper layer being played back in an inner circumferential direction to content information of the lower layer, are set so as to be more to the outside than an innermost circumferential position of the data region.

In the optical disc according to the present embodiment, positions of the above-described point on the upper layer and point on the lower layer can be freely set, and it is possible for a portion suitable for switching in the content information to be selected as a point of switching, and for information to be smoothly read and played back.

Moreover, the optical disc sometimes generates warping or the like in a manufacturing step, hence data recorded on the inner circumferential side can be stored with better reliability. Now, in the optical disc according to the present embodiment, the point on the upper layer and the point on the lower layer one layer below the upper layer at which playback switches from content information of the upper layer being played back in an inner circumferential direction to content information of the lower layer, are set so as to be more to the outside than the innermost circumferential position of the data region. Therefore, in such cases as when, for example, there is specific information which it is desired to preferentially store with good reliability other than content information, this specific information can be stored close to the center of the optical disc.

In the above-described embodiment, a point on the upper layer and a point on the lower layer one layer below the upper layer at which playback of content information of the upper layer being played back in an outer circumferential direction switches to content information of the lower layer, may be set so as to be more to the inside than a certain position. The optical disc according to such an embodiment makes it possible, for example, for a portion suitable for switching in the content information to be selected as a point of switching, and for information to be smoothly read, and played back, as previously mentioned. Moreover, since content information is all stored within a certain range from the center of the optical disc 1, the entire content information can be stored with good reliability.

Moreover, in the above-described embodiment, distances from the center of the optical disc to the point on the upper layer and the point on the lower layer at which playback switches, may match. From the optical disc according to such an embodiment, information can be read without moving a pickup, and information can be read and played back even more smoothly.

Content information of the lower layer may be recorded in the recording layer so as to be played back in a reverse direction to content information of the upper layer.

Moreover, content information of the lower layer may be recorded in the recording layer so as to be played back in an identical direction to content information of the upper layer, and in this case, content information of the lower layer may be played back read randomly from content information of the upper layer. Such an optical disc enables information to be smoothly read and played back, hence enables a high speed search system to be achieved, for example.

Moreover, a picture, for example, may be displayed in a region where content information is not recorded of the recording layer.

An optical disc according to another embodiment of the present invention comprises n ($3 \leq n$) layers of recording layers that each record information in an information track formed in a spiral from one to the other of an inner circumferential side and an outer circumferential side. The recording layer comprises: an inner circumferential side region positioned on the inner circumferential side; a data region which is positioned to the outer circumferential side of the inner circumferential side region and records content information; and an outer circumferential side region positioned to the outer circumferential side of the data region. Moreover, an information amount of content information recorded in the recording layer which is the k-th ($1 \leq k \leq n-1$) layer from a layer furthest from a light source for information playback is larger than an information amount of content information recorded in the recording layer which is the (k+1)-th layer from the layer furthest from the light source for information playback.

Effect of the Invention

The present invention makes it possible to provide an optical disc capable of smoothly reading and playing back information.

EMBODIMENTS FOR CARRYING OUT THE INVENTION

Figure 1:
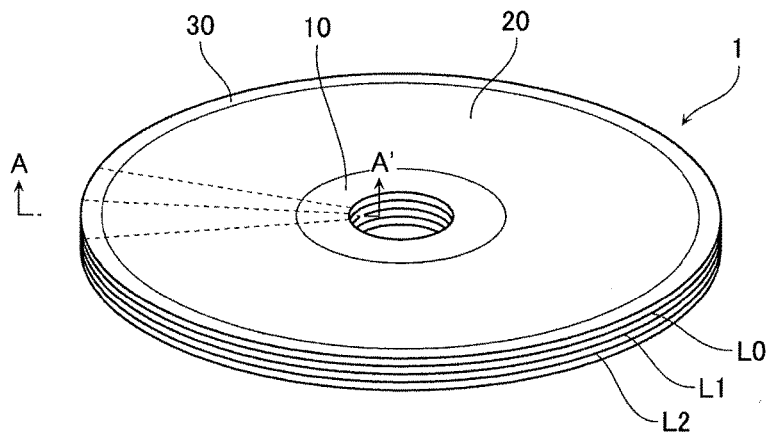
FIG. 1 is a schematic perspective view showing one example of an optical disc 1 according to a first embodiment of the present invention.

Schematic Configuration of Optical Disc According to First Embodiment of Present Invention FIG. 1 is a schematic perspective view showing one example of an optical disc 1 according to a first embodiment of the present invention. The optical disc 1 according to the present embodiment is a stacked type Blu-ray Disc ROM or recording type disc having three layers of recording layers L0-L2 stacked therein. A recording surface of the recording layers L0-L2 is provided with: an inner circumferential side region 10 positioned in a certain region of an inner circumferential side; a data region 20 which is positioned to an outer circumferential side of the inner circumferential side region 10 and records content information; and an outer circumferential side region 30 positioned to the outer circumferential side of the data region 20.

In the recording layers L0 and L2 of the optical disc 1 according to the present embodiment, an information track is formed from the inner circumferential side to the outer circumferential side. Moreover, in the recording layer L1, an information track is formed from the outer circumferential side to the inner circumferential side. Note that the information tracks formed in the recording layers L0-L2 are all formed in a spiral following an identical rotation direction. Therefore, the optical disc 1 always rotates in an identical direction whichever of the recording layers is being played back.

Light for recording or playback is irradiated from a lower surface side of the optical disc 1 in FIG. 1, the recording layer furthest from a light source is L0, and the recording layer closest to the light source is L2. A focus position of the light source is moved up and down, whereby information of the recording layers L0-L2 is recorded or played back.

Figure 2:
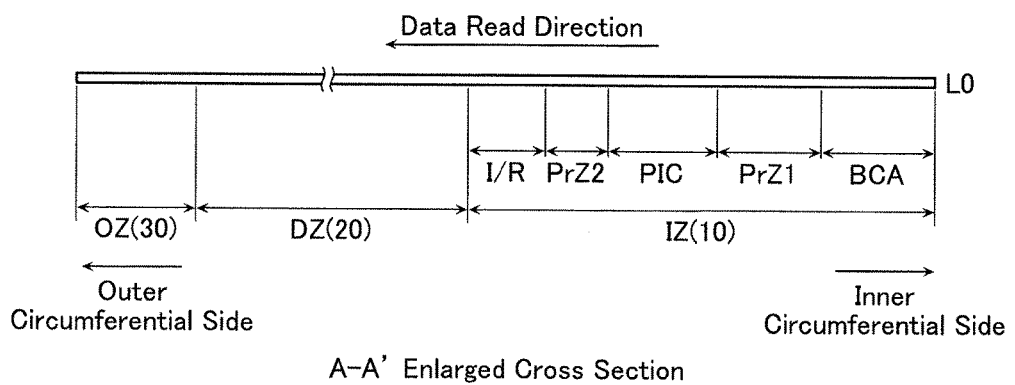
FIG. 2 is a view showing a layout of recorded information of a recording layer L0 in the A-A' cross section.

FIG. 2 is a view showing a layout of recorded information in the A-A' cross section of the recording layer L0. In the present embodiment, the inner circumferential side region (Inner Zone) IZ (10) includes a BCA (Burst Cutting Area). The BCA is a region that records various kinds of information related to the optical disc 1, and is recorded on an optical disc manufacturing master disc, or is formed from the outside by a laser after manufacturing of the optical disc.

Moreover, the inner circumferential side region IZ is utilized as a lead-in region, and includes: a first protection region (Protection Zone) PrZ1, a PIC region (Permanent Information & Control Zone) PIC; a second protection region PrZ2; and an information/reservation region (INFO/Reserved) I/R.

In the case that the optical disc 1 is a recording type medium, the first protection region PrZ1 and the second protection region PrZ2 respectively prevent overwrite of data being performed in the PIC region PIC or the information/reservation region I/R when write amounts of data to the BCA and the PIC region PIC have reached a certain level or more.

On the other hand, in the case that the optical disc 1 is a ROM type medium, the first protection region PrZ1 prevents laser write of the BCA affecting the PIC region. Moreover, the second protection region PrZ2 is provided between a wide pitch region and a normal pitch region which will be described later, and prevents a signal disturbance due to switching of pitch interval on the information track affecting operation of a read drive.

The PIC region PIC records various kinds of information related to the optical disc 1, such as an address of content information or a playback parameter of the optical disc 1. Similarly, the information/reservation region I/R also records various kinds of information related to the optical disc 1.

In the present embodiment, the data region (Data Zone) DZ (20) is provided in a region of from 24.0 to a maximum of 58.0 mm, and records content information such as, for example, a movie or music, a program, and so on.

In the present embodiment, the outer circumferential side region (Outer Zone) OZ (30) is a region to the outer circumferential side of the data region DZ.

Figure 3:
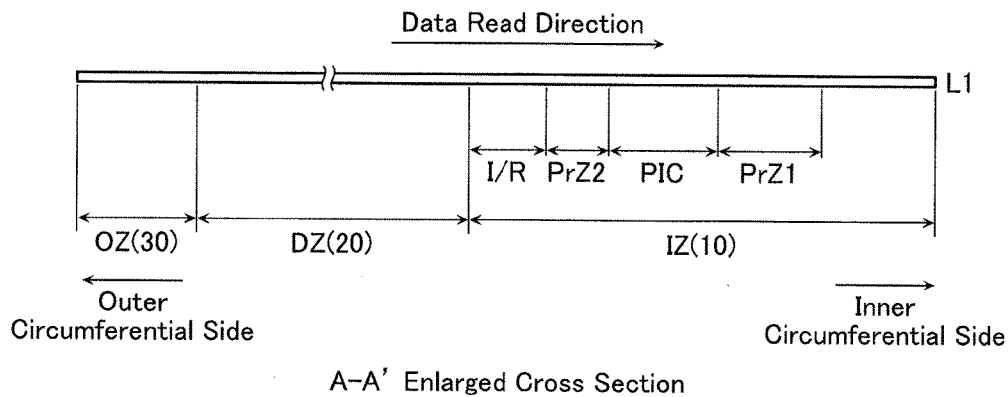
FIG. 3 is a view showing a layout of recorded information of a recording layer L1 in the A-A' cross section.

FIG. 3 is a view showing a layout of recorded information in the A-A' cross section of the recording layer L1. When the optical disc 1 according to the present embodiment is a ROM type medium having three layers of recording layers, the recording layer L1 is not provided with a BCA, a lead-in region, and a lead-out region (FIG. 4).

Figure 4:
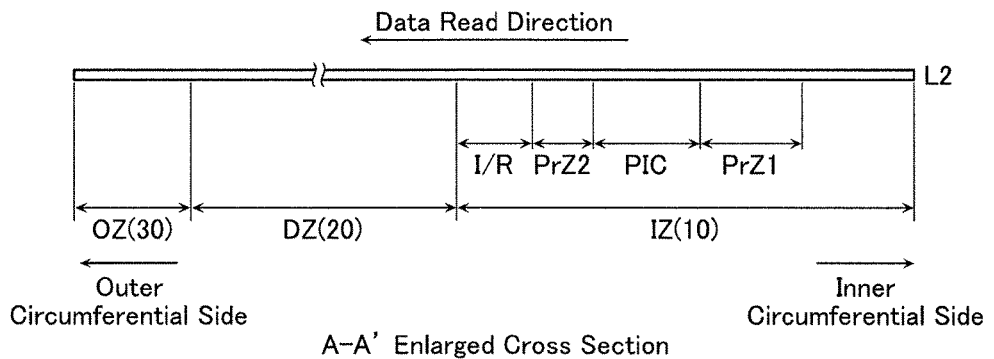
FIG. 4 is a view showing a layout of recorded information of a recording layer L2 in the A-A' cross section.

FIG. 4 is a view showing a layout of recorded information in the A-A' cross section of the recording layer L2. When the optical disc 1 according to the present embodiment is a ROM type medium having three layers of recording layers, the recording layer L2 is not provided with a BCA and a lead-in region. Moreover, the outer circumferential side region OZ of the recording layer L2 is utilized also as a lead-out region.

Note that in the optical disc 1 according to the present embodiment, the lead-in region was provided only in the recording layer L0, and the lead-out region was provided only in the recording layer L2. However, it is also possible, for example, for the lead-in region and the lead-out region to be provided in all of the recording layers L0, L1, and L2.

[Recording Methods of Content Information According to Comparative Examples]

Figure 5:
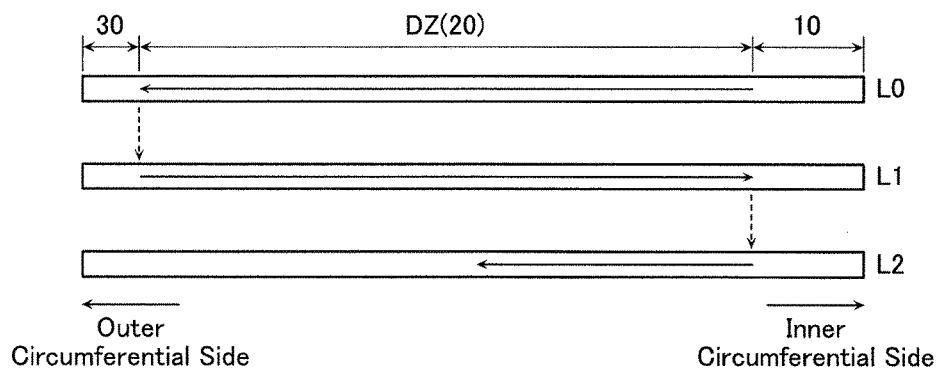
FIG. 5 is a schematic cross-sectional view for explaining a recording method and a playback method of content information, of an optical disc according to a first comparative example.

Next, a recording method of content information according to the present embodiment will be described while comparing with methods according to comparative examples. FIG. 5 is a schematic cross-sectional view for explaining a recording method and a playback method of content information, of an optical disc according to a first comparative example. In the first comparative example, content information is recorded in entire regions of the data regions DZ of the recording layers L0 and L1 and in a region from an innermost circumference to a position partway to the outer circumferential side of the data region DZ of the recording layer L2, regardless of content of the content information.

Reading data from the optical disc is performed by irradiating with a laser at a certain position on the optical disc from a pickup, hence sometimes, due to a layout of data, accessibility is impaired and information cannot be smoothly read and played back. For example, when content information is a moving image, a bit rate of data required in playback is large in a scene having much movement. Therefore, if content information gets recorded by a specific layout regardless of content of the content information, sometimes, focusing is performed at such a timing, speed of read drops, and the moving image is not played back smoothly.

Moreover, the optical disc sometimes generates warping or the like in a manufacturing step, hence data recorded on the inner circumferential side can be stored with better reliability. Therefore, when, for example, there is specific information which it is desired to preferentially store with good reliability other than content information, this specific information is desirably recorded close to the center of the optical disc.

Figure 6:
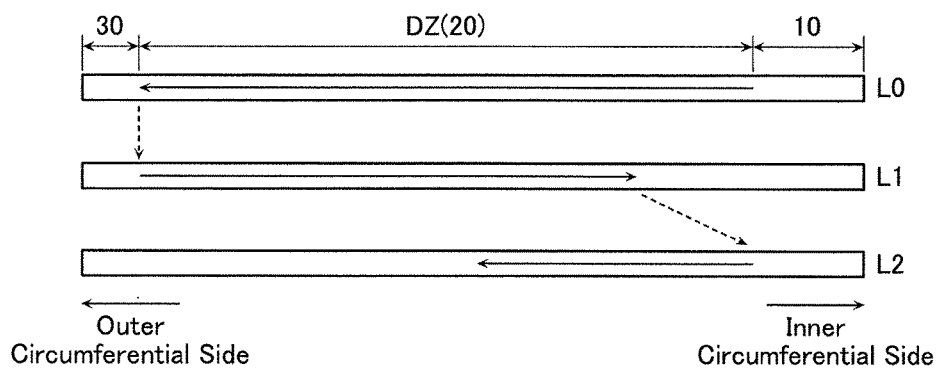
FIG. 6 is a schematic cross-sectional view for explaining a recording method and a playback method of content information, of an optical disc according to a second comparative example.

FIG. 6 is a schematic cross-sectional view for explaining a recording method and a playback method of content information, of an optical disc according to a second comparative example. In the second comparative example, content information is recorded in an entire region of the data region DZ of the recording layer L0, in a region from an outermost circumference to a position partway to the inner circumferential side of the data region DZ of the recording layer L1, and in a region from the innermost circumference to a position partway to the outer circumferential side of the data region DZ of the recording layer L2, regardless of content of the content information.

In the optical disc according to the second comparative example also, content information is recorded by a specific layout regardless of content of the content information. Moreover, in the optical disc according to the second comparative example, the above-described specific information can be recorded in a region from the innermost circumference to a position partway to the inner circumferential side of the data region DZ of the recording layer L1, and this specific information can be stored with good reliability. However, in the second comparative example, a recording finish position of content information recorded in the recording layer L1 and a recording start position of content information recorded in the recording layer L2 are separated. Therefore, the need arises to move the pickup after content information has been read from the recording layer L1. However, it is possible to broaden a choice of means of selecting an arbitrary position not interfering with content playback and moving to another layer.

[Recording Method of Content Information According to Present Embodiment]

Figure 7:
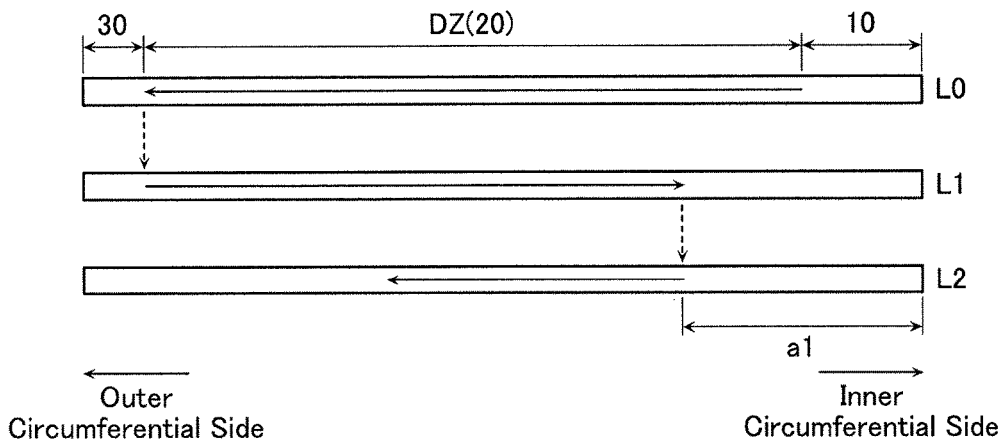
FIG. 7 is a schematic cross-sectional view for explaining a recording method and a playback method of content information, of the optical disc according to the first embodiment of the present invention.

Next, the recording method of content information according to the present embodiment will be described. FIG. 7 is a schematic cross-sectional view for explaining the recording method and a playback method of content information, of the optical disc 1 according to the present embodiment. In the present embodiment, part of the content information is recorded from the inner circumferential side to the outer circumferential side, in an entire region of the data region DZ of the recording layer L0. In addition, information of a continuation of this part is stored from the outer circumferential side to the inner circumferential side, in a region from the outermost circumference to a position a1 partway to the inner circumferential side of the data region DZ of the recording layer L1. Furthermore, information of a further continuation of this information is recorded from the inner circumferential side to the outer circumferential side, in a region from the above-described position a1 to a position partway to the outer circumferential side of the data region DZ of the recording layer L2. Note that distances from the center of the optical disc 1 of the recording finish position of content information in the recording layer L1 and the recording start position of content information in the recording layer L2 need not perfectly match, and need only substantially match.

In the present embodiment, a portion suitable for switching is adopted in the recording finish position of content information in the recording layer L1 and the recording start position of content information in the recording layer L2. As this portion suitable for switching, it is possible to effectively utilize a portion where bit rate is small in the content information, such as a scene where there is comparatively little change in an image in a moving image, or a portion where there is comparatively little sound in music, for example.

Now, positions in a horizontal plane (positions in the rotation direction) of the recording finish position of content information in the recording layer L1 and the recording start position of content information in the recording layer L2 need not substantially match, and there may also be provided a region of a certain blank, for example. It is also possible for a length of this blank to be determined in view of the likes of a time required for focusing, or an angle that the optical disc 1 rotates during this time, for example. Moreover, it is also possible for dummy data for performing focusing to be recorded in advance in this blank region.

Note that in the case of adopting the recording method of content information according to the present embodiment, as shown in FIG. 7, an information amount of content information recorded in the recording layer Lk (k=0 and 1) is larger than an information amount of content information recorded in the recording layer Lk+1. Moreover, a region where content information is recorded in the recording layer Lk contains all of a region where content information is recorded in the recording layer Lk+1.

Moreover, in the present embodiment, the likes of the recording start positions or finish positions in each of the recording layers L0-L2 of the content information, are recorded in the PIC region.

In the present embodiment, the point on the upper layer and the point on the lower layer one layer below the upper layer at which playback switches from content information of the upper layer being played back in an inner circumferential direction to content information of the lower layer, is set so as to be more to the outside than the innermost circumferential position of the data region. That is, in the optical disc according to the present embodiment, positions of the above-described point on the upper layer and point on the lower layer can be freely set, and it is possible for the portion suitable for switching in the content information to be selected as the point of switching, and for information to be smoothly read and played back.

Moreover, content information is not recorded in the region from the innermost circumference to the position a1 partway to the outer circumferential side of the data region DZ, of the recording layers L1 and L2, hence the above-described specific information can be recorded in this region. Furthermore, distances from the center of the optical disc 1 to the recording finish position of content information in the recording layer L1 and the recording start position of content information in the recording layer L2, substantially match. Therefore, after content information has been read from the recording layer L1, content information can be rapidly read from the recording layer L2 without moving the pickup.

Note that the above-described position a1 exists in the data region DZ. Therefore, a distance from the center of the optical disc 1 of the position a1 is 24.0-58.0 mm in the present embodiment. Moreover, the position a1 is, for example, either conceivably determined based on the portion suitable for switching in the content information, or conceivably determined based on size of the above-described specific information.

[Recording Method of Content Information According to Second Embodiment of Present Invention]

Figure 8:
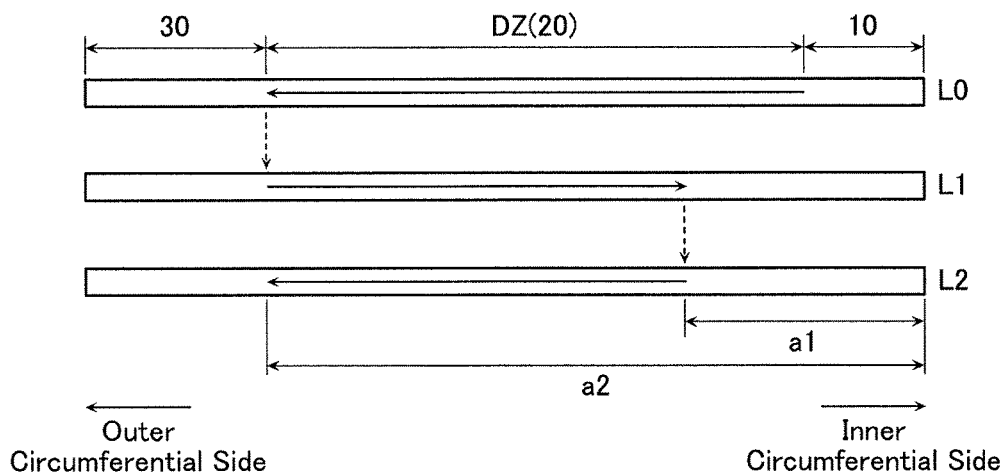
FIG. 8 is a schematic cross-sectional view for explaining a recording method and a playback method of content information, of an optical disc according to a second embodiment of the present invention.

Next, a recording method of content information according to a second embodiment of the present invention will be described. FIG. 8 is a schematic cross-sectional view for explaining the recording method and a playback method of content information, of an optical disc according to the present embodiment.

The recording method of content information according to the present embodiment is basically similar to the recording method of content information according to the first embodiment, but in the present embodiment, content information is recorded in a region from the innermost circumference to a position a2 (a2<58.0 mm) of the data region DZ of the recording layer L0, and in regions from the position a1 to the position a2 of the data regions DZ of the recording layers L1 and L2. Note that, distances from the center of the optical disc 1 to the recording finish positions of content information in the recording layers L0 and L2 and the recording start position of content information in the recording layer L1 need not perfectly match, and need only substantially match.

Note that the position a2 may also be determined based on, for example, the portion suitable for switching in the content information, and sizes of content information and the above-described specific information.

Moreover, in the present embodiment, a portion suitable for switching in the content information is adopted not only in the recording finish position of content information in the recording layer L1 and the recording start position of content information in the recording layer L2, but also in the recording finish position of content information in the recording layer L0 and the recording start position of content information in the recording layer L1.

In the optical disc according to the present embodiment, the point on the upper layer and the point on the lower layer one layer below the upper layer at which playback of content information of the upper layer being played back in an outer circumferential direction switches to content information of the lower layer, are set so as to be more to the inside than 58.0 mm. Therefore, similarly to in the first embodiment, it is possible for the portion suitable for switching in the content information to be selected as the point of switching, and for information to be smoothly read and played back.

Moreover, in the optical disc according to the present embodiment, content information is all stored within a certain range from the center of the optical disc 1, hence the entire content information can be stored with good reliability. Furthermore, the recording finish position of data in the recording layer L0 and the recording start position of data in the recording layer L1, and the recording finish position of data in the recording layer L1 and the recording start position of data in the recording layer L2, substantially match, hence a rapid read can be performed.

[Recording Method of Content Information According to Third Embodiment of Present Invention]

Figure 9:
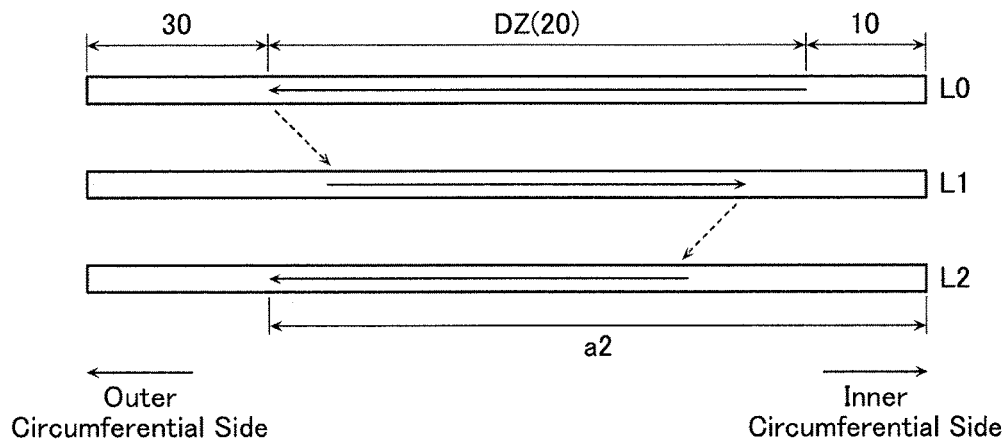
FIG. 9 is a schematic cross-sectional view for explaining a recording method and a playback method of content information, of an optical disc according to a third embodiment of the present invention.

Next, a recording method of content information according to a third embodiment of the present invention will be described. FIG. 9 is a schematic cross-sectional view for explaining the recording method and a playback method of content information, of an optical disc according to the present embodiment.

The recording method of content information according to the present embodiment is basically similar to the recording method of content information according to the second embodiment, but in the present embodiment, distances from the center of the optical disc of the recording finish positions of content information in the recording layers L0 and L1 and the recording start positions of content information in the recording layers L1 and L2, are not matched substantially. Even in such a mode, similarly to in the first and second embodiments, information can be smoothly played back. Moreover, even in the present embodiment, in the recording layers L0, L1, and L2, content information is all stored in a region from the innermost circumference to the above-described point a2 of the data region DZ, and the entire content information can be stored with good reliability.

[Recording Method of Content Information According to Fourth Embodiment of Present Invention]

Figure 10:
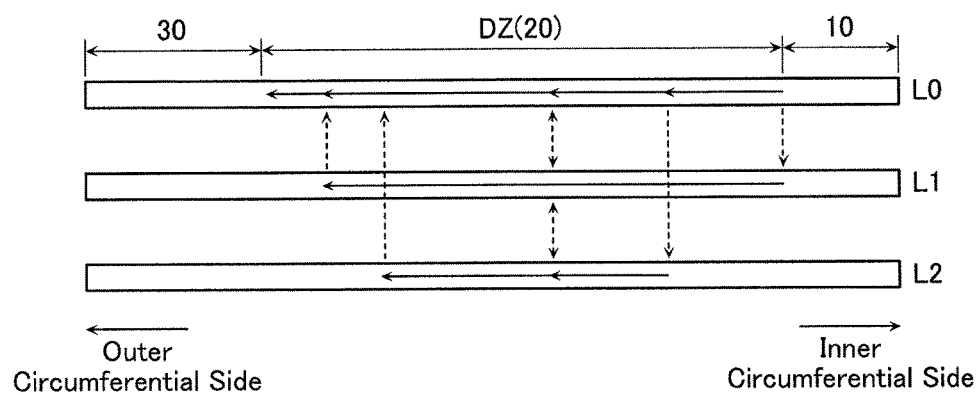
FIG. 10 is a schematic cross-sectional view for explaining a recording method and a playback method of content information, of an optical disc according to a fourth embodiment of the present invention.

Next, a recording method of content information according to a fourth embodiment of the present invention will be described. FIG. 10 is a schematic cross-sectional view for explaining the recording method and a playback method of content information, of an optical disc according to the present embodiment.

The optical disc according to the present embodiment is a stacked type Blu-ray Disc having three layers of recording layers L0-L2 stacked therein, and content information recorded in the recording layer of a lower layer is played back read randomly from content information recorded in the recording layer of an upper layer. Recording surfaces of the recording layers L0-L2 are provided with the inner circumferential side region 10, the data region 20, and the outer circumferential side region 30, similarly to in the first embodiment. Note that descriptions of data structures of the inner circumferential side region 10 and the outer circumferential side region 30, and so on, will be omitted.

In the recording layers L0-L2 of the optical disc according to the present embodiment, the information tracks are formed from the inner circumferential side to the outer circumferential side. Moreover, these information tracks are all formed in a spiral following an identical rotation direction. Therefore, the optical disc according to the present embodiment always rotates in an identical direction whichever of the recording layers is being played back. Note that a direction in which the information tracks are formed may be appropriately changed, and, for example, the information tracks in the recording layers L0-L2 may all be formed in a direction directed from the outer circumferential side to the inner circumferential side.

Light for recording or playback is irradiated from a lower surface side of the optical disc in FIG. 10, the recording layer furthest from the light source is L0, and the recording layer closest to the light source is L2. The focus position of the light source is moved up and down, whereby information of the recording layers L0-L2 is recorded or played back.

Information including link information is recorded as content information in the data region 20 of the recording layer L0. Moreover, information of a link destination of this link information is recorded in the data regions 20 of the recording layers L1 and L2. Furthermore, distances from the center of the optical disc to the recording finish positions of the link information in the recording layer L0 and the recording start positions of the information of the link destinations in the recording layers L1 and L2, substantially match.

Moreover, in the optical disc according to the present embodiment, as shown in FIG. 10, the information amount of content information recorded in the recording layer Lk (k=0 and 1) is larger than the information amount of content information recorded in the recording layer Lk+1. Moreover, the region where content information is recorded in the recording layer Lk contains all of the region where content information is recorded in the recording layer Lk+1.

In the case of employing the optical disc according to the present embodiment, it is possible that after the link information recorded in the recording layer L0 has been read, a continuation of information recorded in the recording layer L0 or information of the link destination recorded in the recording layer L1 or L2 is rapidly read, based on conditions of external operation, and so on. Therefore, when, for example, such an optical disc is applied to the likes of a navigation system or database, it becomes possible for movement of the pickup to be suppressed whereby desired data is rapidly accessed, and a high speed search system can be achieved.

[Recording Method of Content Information According to Fifth Embodiment of Present Invention]

Figure 11:
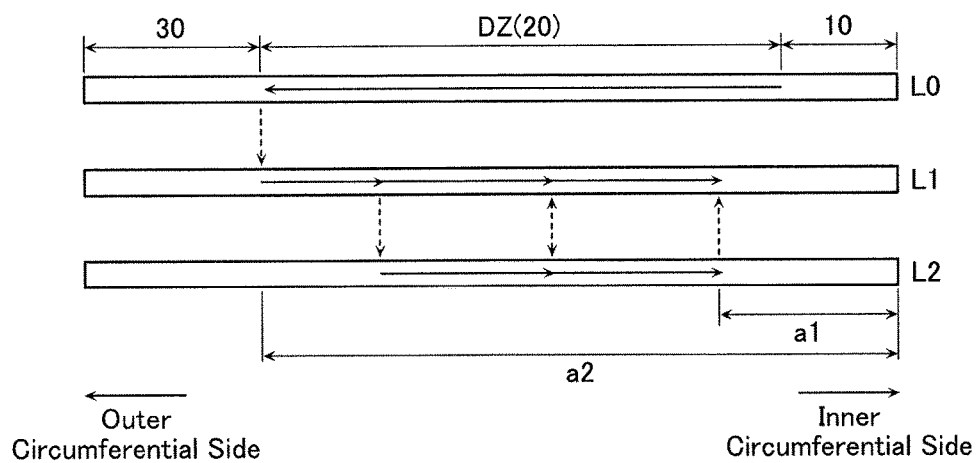
FIG. 11 is a schematic cross-sectional view for explaining a recording method and a playback method of content information, of an optical disc according to a fifth embodiment of the present invention.

Next, a recording method of content information according to a fifth embodiment of the present invention will be described. FIG. 11 is a schematic cross-sectional view for explaining the recording method and a playback method of content information, of an optical disc according to the present embodiment.

The optical disc according to the present embodiment is a stacked type Blu-ray Disc having three layers of recording layers L0-L2 stacked therein. Recording surfaces of the recording layers L0-L2 are provided with the inner circumferential side region 10, the data region 20, and the outer circumferential side region 30, similarly to in the first embodiment. Note that descriptions of data structures of the inner circumferential side region 10 and the outer circumferential side region 30, and so on, will be omitted.

In the optical disc according to the present embodiment, contrary to in a so-called OTP type or PTP type optical disc, the information track in the recording layer L0 is formed in a direction directed from the inner circumferential side to the outer circumferential side, and the information tracks in the recording layers L1 and L2 are formed in a direction directed from the outer circumferential side to the inner circumferential side. Moreover, these information tracks are all formed in a spiral following an identical rotation direction. Therefore, the optical disc according to the present embodiment always rotates in an identical direction whichever of the recording layers is being played back.

Light for recording or playback is irradiated from a lower surface side of the optical disc in FIG. 11, the recording layer furthest from the light source is L0, and the recording layer closest to the light source is L2. The focus position of the light source is moved up and down, whereby information of the recording layers L0-L2 is recorded or played back.

In the data region 20 of the recording layer L0, content information is recorded along the information track, and in the data region 20 of the recording layer L1, content information of a continuation of this is further recorded. Moreover, in the present embodiment, a portion suitable for switching in the content information is adopted as the recording finish position of content information in the recording layer L0 and the recording start position of content information in the recording layer L1. Furthermore, content information recorded in the data region 20 of the recording layer L1 includes link information, and information of a link destination of this link information is recorded in the data region 20 of the recording layer L2. In addition, distances from the center of the optical disc to the recording finish position of the link information in the recording layer L1 and the recording start position of the information of the link destination in the recording layer L2, substantially match.

Note that in the case of adopting the recording method of content information according to the present embodiment, as shown in FIG. 11, the information amount of content information recorded in the recording layer Lk (k=0 and 1) is larger than the information amount of content information recorded in the recording layer Lk+1. Moreover, the region where content information is recorded in the recording layer Lk contains all of the region where content information is recorded in the recording layer Lk+1.

In the case of employing the optical disc according to the present embodiment, it is possible that while read of information recorded in the data region 20 of the recording layer L1 is being performed, information of the link destination recorded in the data region 20 of the recording layer L2 is rapidly read, based on conditions of external operation, and so on. Therefore, when such an optical disc is employed in recording of a movie or the like, it is also possible for notes, and so on, related to a scene of the movie to be displayed in response to an operation.

Optical Discs According to Other Embodiments

The optical discs according to the above-described embodiments each had three layers of recording layers, but in an optical disc having four or more layers of recording layers, storage capacity further increases. Therefore, the present invention may also be applied to an optical disc having four or more layers of recording layers.

Moreover, in the case where, for example, an optical disc is provided with n (3≤n) layers of recording layers, it is also possible to adjust such that an information amount of content information recorded in the recording layer which is the k-th ($1 \leq k \leq n-1$) layer from a layer furthest from a light source for information playback is larger than an information amount of content information recorded in the recording layer which is the (k+1)-th layer from the layer furthest from the light source for information playback.

Moreover, the optical disc according to the above-described fifth embodiment was configured to enable content information recorded in the recording layer L2 to be accessed while content information recorded in the recording layer L1 was being read. However, it may also be configured to, for example, enable content information recorded in the recording layer L1 or L2 to be accessed while content information recorded in the recording layer L0 is being read. Furthermore, when the optical disc has four layers of recording layers, a series of content information items including link information may be recorded in the recording layers L0 and L2, for example, and information of link destinations may be respectively recorded in the recording layers L1 and L3.

Moreover, in each of the optical discs according to the above-described embodiments, recording start positions or finish positions in each of the recording layers of content information was recorded in the PIC region of the recording layer L0, but these data may also be recorded in a region other than the PIC region.

Furthermore, in the optical discs according to the above-described embodiments, it is also possible that when, for example, data is not recorded in a region having a certain distance or more from the center of the optical disc, a picture is displayed in this region where data is not recorded. Display of the picture is conceivably performed by, for example, pit art utilizing a pit, a groove, or a land in a drawing, or is conceivably performed by, for example, performing printing on the above-described region where data is not recorded. This makes it possible to increase an added value of the optical disc.

DESCRIPTION OF REFERENCE NUMERALS

1 . . . optical disc
10 . . . inner circumferential side region
20 . . . data region
30 . . . outer circumferential side region
L0-L2 . . . recording layer

The invention claimed is:
1. An optical disc, comprising
   first to third recording layers that each record information in an information track formed in a spiral from one to the other of an inner circumferential side and an outer circumferential side,
   each of the first to third recording layers comprising:
   an inner circumferential side region positioned on the inner circumferential side;
   a data region positioned to the outer circumferential side of the inner circumferential side region, the data region recording a part of content information; and
   an outer circumferential side region positioned to the outer circumferential side of the data region,
   the first recording layer recording a first part of the content information in a first information track starting from a first point and finishing at a second point provided more outside than the first point,
   the second recording layer recording a second part of the content information in a second information track starting from a third point and finishing at a fourth point provided more inside than the third point, and
   the third recording layer recording a third part of the content information in a third information track starting from a fifth point and finishing at a sixth point provided more outside than the fifth point, wherein
   the first point is provided at an innermost circumferential position of the data region of the first recording layer, and
   the fourth and fifth points are provided more outside than the first point.

2. The optical disc according to claim 1, wherein distances from the center of the optical disc to the second point and the third point substantially match.

3. The optical disc according to claim 1, wherein distances from a center of the optical disc to the fourth point and the fifth point substantially match.

4. The optical disc according to claim 1, wherein the sixth point is provided more inside than the second point and the third point.

5. The optical disc according to claim 1, wherein the second, third and sixth points are provided at outermost circumferential positions of the data regions of the first to third recording layers.

6. The optical disc according to claim 1, wherein
   the second recording layer records a part of specific information between the innermost circumferential position of the data region and the fourth point, and
   the third recording layer records another part of the specific information between the innermost circumferential position of the data region and the fifth point.

* * * * *